United States Patent
Hiddessen

[11] Patent Number: 5,979,869
[45] Date of Patent: Nov. 9, 1999

[54] VALVE

[75] Inventor: Ralf Hiddessen, Lehrte/Arpke, Germany

[73] Assignee: Press Controls AG Rumland, Rumland, Switzerland

[21] Appl. No.: 09/024,169

[22] Filed: Feb. 17, 1998

[30] Foreign Application Priority Data

Feb. 18, 1997 [DE] Germany ............... 197 06 264

[51] Int. Cl.⁶ ................................................. F16K 25/00
[52] U.S. Cl. ...................... 251/285; 137/494; 251/333
[58] Field of Search .................. 137/494; 251/333, 251/285 I, 359, 364, 365, 324

[56] References Cited

U.S. PATENT DOCUMENTS

| 3,358,964 | 12/1967 | Cohen et al. | .......................... 251/324 |
| 3,489,171 | 1/1970 | Michael et al. | ..................... 251/333 X |
| 3,592,222 | 7/1971 | Goss | .................................. 137/494 X |

FOREIGN PATENT DOCUMENTS 3-15487 A1   10/1981   Germany .

*Primary Examiner*—Stephen M. Hepperle
*Attorney, Agent, or Firm*—Reising, Ethington, Barnes, Kisselle, Learman & McCulloch P.C.

[57] ABSTRACT

The invention relates to a valve with a piston which is movable to and fro in a housing between an open and a closed position, wherein the piston has a first contact zone which in the closed position comes into contact with a second contact zone on the housing. The first contact zone on the piston is constructed as a cone which increases from a first diameter to a greater second diameter. The second contact zone on the housing is constructed as a flexible lip. The piston is configured in such a way and the flexible lip is deformable in such a way that—when the valve is installed—the piston can be pushed through the opening of the flexible lip in the region of the greater second diameter of the conical surface.

6 Claims, 3 Drawing Sheets

VALVE

The invention relates to a valve with a piston which is movable to and fro in the housing between an open and a closed position, wherein the piston has a first contact zone which in the closed position comes into contact with a second contact zone on the housing.

BACKGROUND OF THE INVENTION

In order to ensure a good sealed seating of the piston in the closed position, in the manufacture of the piston and the valve seat it is often necessary to adhere to very close tolerances. However, adherence to these tolerances considerably increases the manufacturing costs.

A valve of the general class to which the invention relates is disclosed in DE-A-30 15 487, but this has an additional sealing element which comes into operation when the plate-shaped sealing element breaks. Also, with this known valve seat it is still necessary to adhere to relatively close tolerances in order to ensure a good sealed seating.

The object of the invention, therefore, is to provide an improved valve construction in which the manufacturing costs are reduced.

SUMMARY OF THE INVENTION

According to the invention the first contact zone is provided on the piston as a conical surface or seat which increases from a first diameter to a greater second diameter. Furthermore the housing is provided with an annular, flexible lip and the piston and the lip are configured in such a way and the flexible lip is deformable so that, when the valve is installed, the piston can be pushed through the opening of the flexible lip whereupon the greater diameter of the conical surface seats on the flexible lip and closes the valve.

As the piston is pushed through the opening of the flexible lip during installation, this results in on the one hand a plastic deformation and on the other hand an elastic deformation of the flexible lip. After allowing the passage of the conical region of the piston, the opening of the flexible lip will again decrease according to the elastic component. Therefore the greatest diameter of the piston in this region may have an oversize within the range of the maximum plastic and elastic deformability of the flexible lip. In this case the extent of the plastic deformability of the flexible lip determines the tolerance which is tolerable for the piston.

THE DRAWINGS

Further advantages and constructions of the invention are explained in greater detail with reference to the description of two embodiments and to the drawings, in which:

FIG. 1 shows a cut-away representation of a valve according to a first embodiment of the invention, FIG. 2 shows a cut-away view of a detail of the first embodiment in the sealing region, and FIG. 3 shows a cut-away representation of a valve according to a second embodiment of the invention.

DETAILED DESCRIPTION

Figure 1:
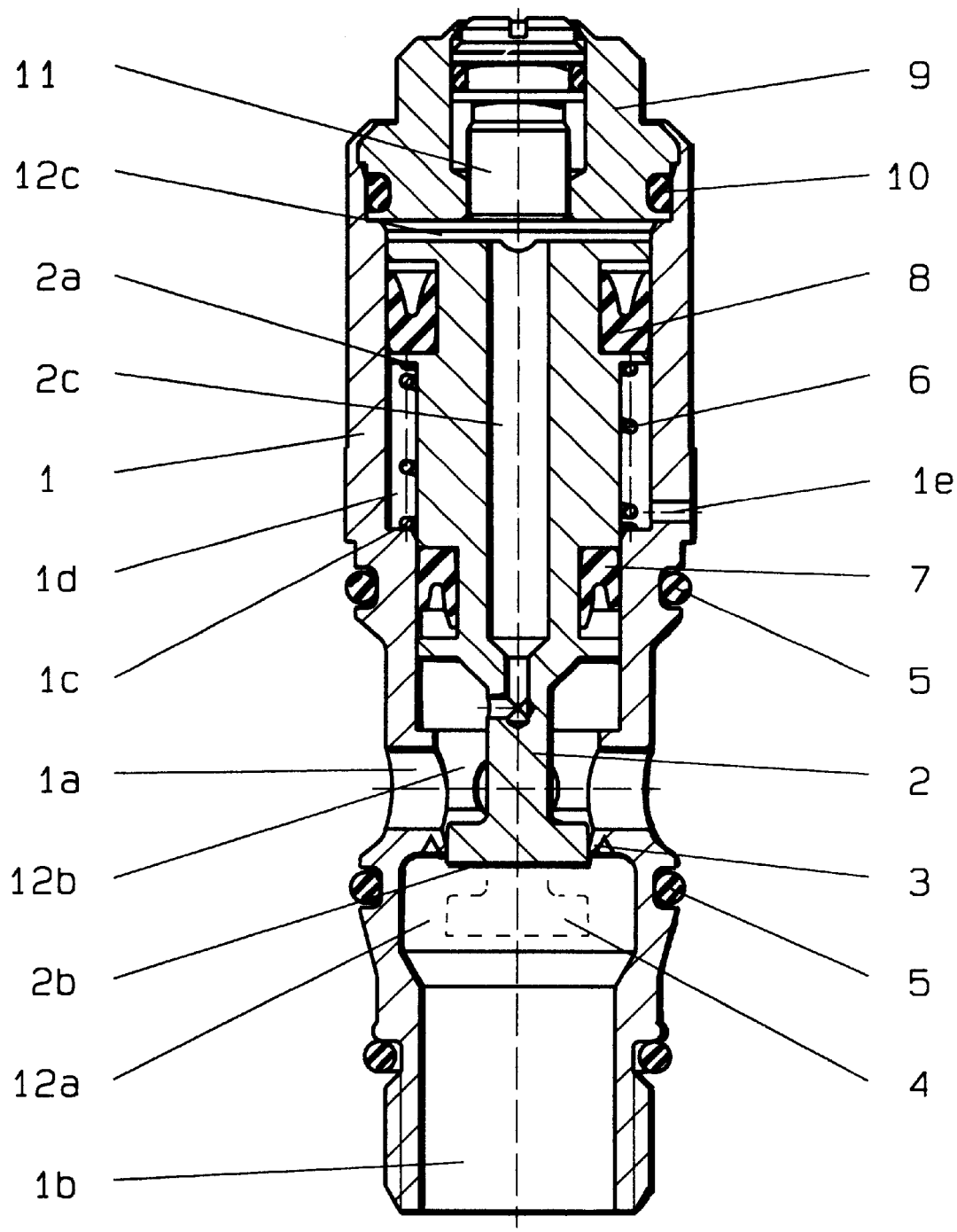

The valve illustrated in FIG. 1 consists essentially of a housing 1 and a piston 2 which is movable to and fro therein between a closed and an open position. In the illustrated closed position the piston comes into contact with a valve seat on the housing which is formed by a flexible lip 3.

The illustrated valve is constructed as a so-called starting valve for progressive build-up of pressure in an installation through which pressure medium flows. Such starting valves are intended to prevent dangerous and damaging pressure surges in compressed air installations such as can occur upon switching on of a compressed air installation which has previously been switched off and vented.

The housing 1 of the starting valve illustrated in FIG. 1 is formed by a hollow screw which has a first opening 1a and a second opening 1b. In the illustrated embodiment the first opening 1a is formed by four lateral bores distributed regularly over the periphery of the housing, wherein the region of these bores a module is provided which is releasably fixed on the housing and rotatable about itself, is generally known and is not shown in greater detail for reasons of clarity. This rotatable module is connected in a pressure-tight manner by way of seals 5.

Furthermore a spring element 6 which pushes the piston 2 into its closed position is provided in the housing 1. This spring element 6 is supported on the one hand on an annular shoulder 1c of the housing and on the other hand on a flange-like extension 2a of the piston 2. The spring element 6 is accommodated in a chamber 1d between the housing 1 and the piston 2. In order to seal off the chamber so as to be pressure-tight against the other regions of the housing, a first and second seal 7, 8 are provided between the piston and the housing. The chamber 1d communicates by way of an air vent 1e with the ambient air, so that ambient pressure prevails in it.

The second opening 1b is provided in the region of one end of the hollow screw, whilst the other end is closed off so as to be pressure-tight by means of a closure element 9 and an inlaid seal 10.

The illustrated starting valve is coupled in the region of its first opening 1a by way of the rotatable module (not shown in greater detail) to a first component of an installation through which pressure medium flows and with its second opening 1b to a second component of this installation. The starting valve also has means for maintaining a low flow of pressure medium between a region with high pressure on one side of the flexible lip 3 and a region with pressure building up on the other side of the flexible lip.

In the open position the piston takes up approximately the position 4 represented by broken lines in the drawing. The means for maintaining a low flow of pressure medium are actuated by adjusting means 11 which limit the movement of the piston 2 from the open to the closed position before it reaches the closed posit ion. In this way there is formed between the flexible lip 3 and the piston an annular throttle opening by which a low flow of pressure medium can be maintained.

In the illustrated embodiment the high pressure is applied in the region of the second opening 1b. In this initial situation the starting valve can be divided into the following three regions 12a, 12b, and 12c.

The first region 12a is provided in the region of the second opening 1b and is defined by the inner wall of the housing 1 in the region of the second opening 1b and the end face 2b of the piston 2 in the region of the valve seat.

By way of the annular throttle opening which is formed by the flexible lip 3 and the piston 2 the high pressure proceeds gradually into the second region 12b which is defined by an inner wall of the housing 1 and an outer wall of the piston 2. The first seal 7 is provided at one point of contact between the housing and the piston, and the flexible lip is provided at the other point. Thus in the second region 12b the pressure which is building up prevails.

Since the action surface on the piston in the first region 12a which is formed essentially by the end face 2b and also the total action surface on the piston in the second region 12b pushes the piston into the closed position, a further action surface must be provided which is located in a third region 12c at the opposite end of the piston 2. For this the piston 2 has an inner channel 2c which connects the second region 12b to the third region 12c. Thus the pressure which is building up prevails in the third region 12c. The action surface on the piston in the third region pushes the piston into its open position and thus acts against the action surface of the first region. Since the action surface in the third region is substantially greater than that of the first region, the piston 2 is moved into its open position when the difference between the high pressure and the pressure which is building up falls below a threshold value.

Figure 2:
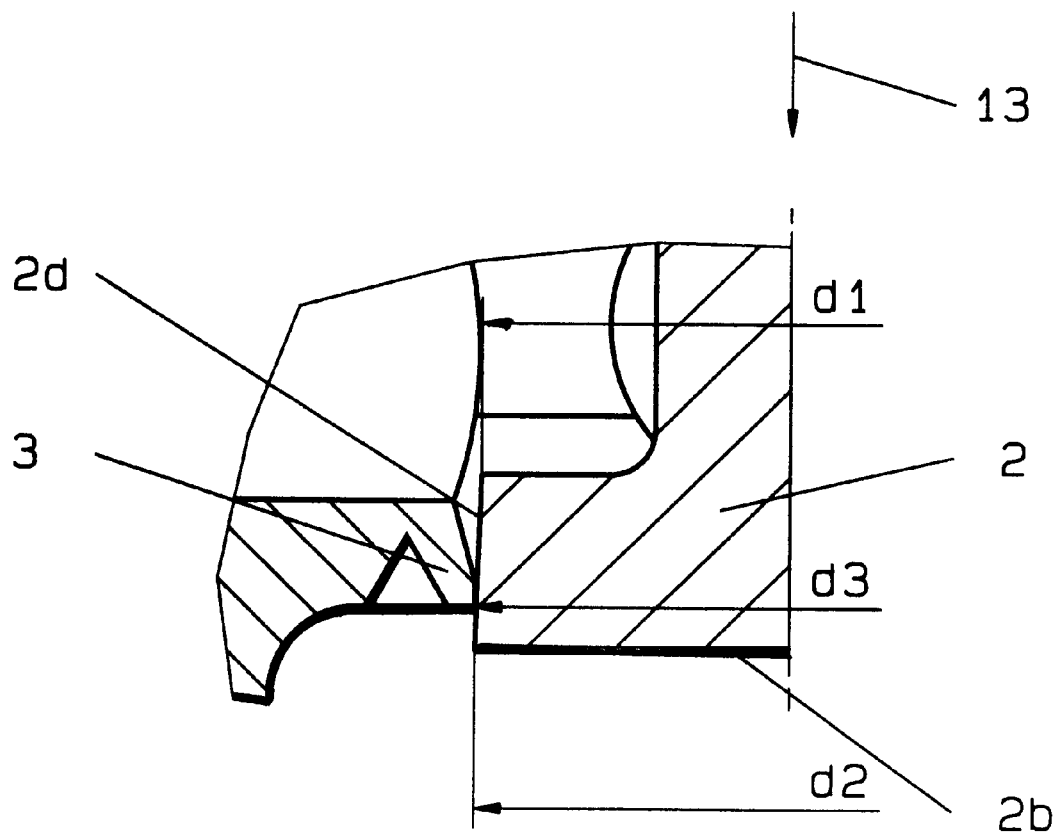

Thee conditions in the region of the flexible lip 3 will be set out in greater detail below with reference to FIG. 2.

The flexible lip 3 is constructed with a closed annular shape. It is preferably provided as a metal flexible lip and, as shown in the drawings, can for example be constructed as an integral and unitary part of the housing 1.

In the closed position the flexible lip 3 comes into contact with a region 2d of the piston which is constructed as a conical surface. The diameter of the piston 2 in the region of the conical surface increases from a first diameter $d_1$ to a greater second diameter $d_2$.

The flexible lip 3 has an aperture diameter $d_3$ which is greater than the first diameter $d_1$ but smaller than the second diameter $d_2$ of the piston 3 in the region of the conical surface. In the closed position of the piston, therefore, no clearance exists between the conical surface of the piston and the lip, whereas in the open position of the piston clearance between the latter and the lip does exist.

Therefore the flexible lip 3 comes into contact with the conical surface anywhere between the small and large diameters $d_1$, $d_2$ of the piston in the region $2_d$.

The flexible lip 3 is deformable such that when the valve is installed the piston 2 can be pushed—in the direction of the arrow 13—from the opened to the closed positions of the piston—through the opening of the flexible lip in the region of the greater second diameter $d_2$ of the conical surface. In this case the aperture diameter $d_3$ of the flexible lip 3 widens to the diameter $d_2$ of the piston 2 if it is assumed that the piston is indefinitely rigid.

This operation results in on the one hand a plastic deformation and on the other hand an elastic deformation of the flexible lip. After allowing the passage of the cone, the opening of the flexible lip will again decrease according to the elastic component.

Therefore the greatest diameter of the piston in this region may have an oversize within the range of the maximum plastic and elastic deformability of the flexible lip. In this case the extent of the plastic deformability of the flexible lip determines the tolerance which is tolerable for the piston.

The construction of the flexible lip 3 as a metal bending lip 3 does not lead to premature wear in this region. When the piston is installed, due to the elasticity of the flexible lip it is only necessary to overcome low forces in order to push the piston through the narrower opening of the flexible lip. Therefore distortion of the piston can be avoided.

Figure 3:
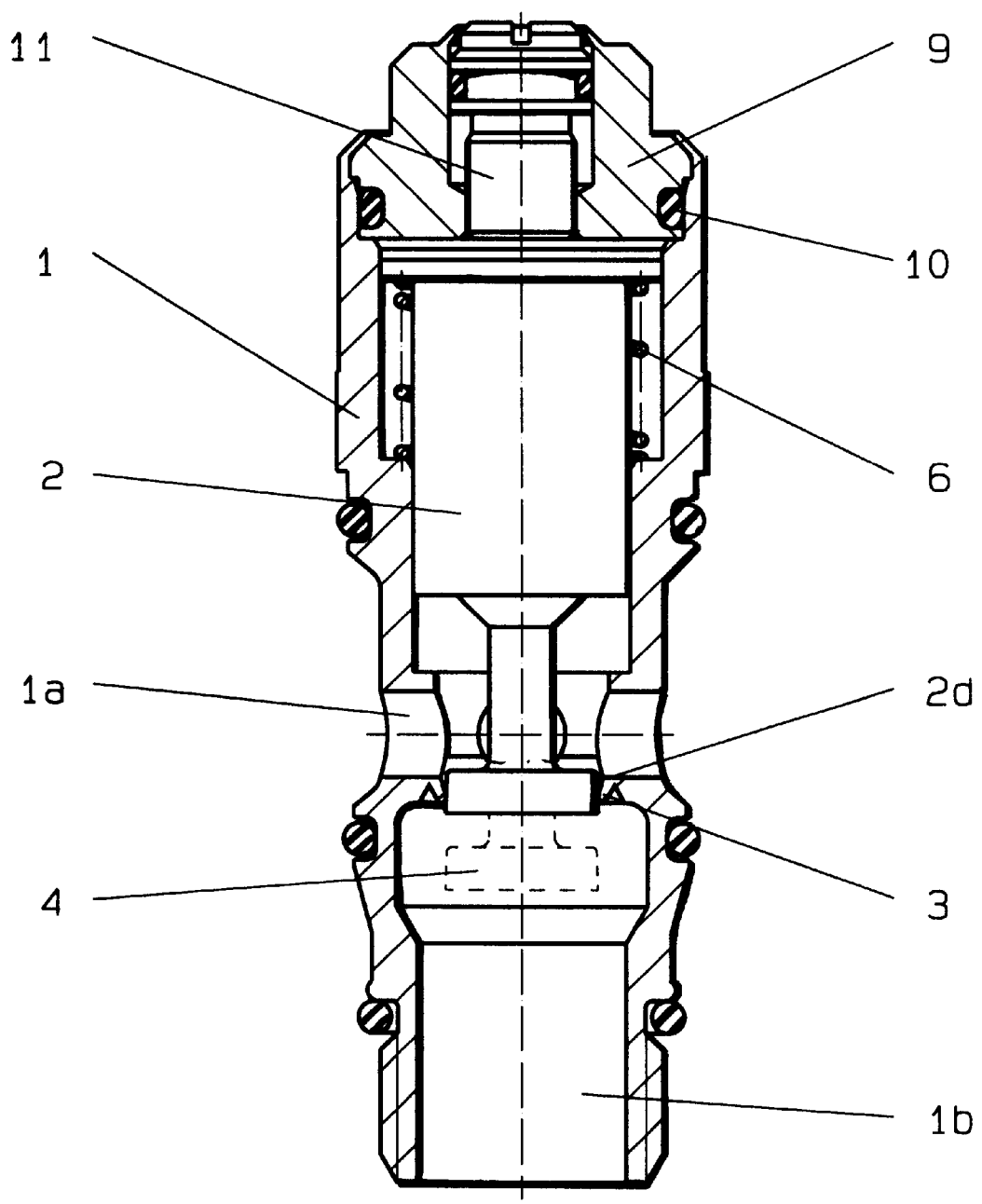

FIG. 3 shows a second embodiment in which the valve is constructed as a throttle check valve. Since it corresponds in many regions and components to the starting valve shown in FIG. 1, the same reference numerals are also used for the same components. Thus in particular the construction of the valve seat as a flexible lip 3 and of the region of the piston 2 which comes into contact therewith corresponds to the representation according to FIG. 2.

The adjusting means 11 again facilitate the adjustment of an annular throttle gap between the flexible lip 3 and the cone on the piston 2.

The essential difference between this construction and that of the first embodiment is that the piston 2 according to FIG. 3 does not have an inner channel 2c and that the seals 7 and 8 according to FIG. 1 are not provided. Therefore the check valve according to FIG. 3 functions as follows:

If a higher pressure is applied at the connection in the region of the opening 1a than in the region of the second opening 1b, the piston is pushed into the open position 4 represented by broken lines as soon as the pressure difference is so great that the force of the spring element 6 is overcome. If the pressure again falls below this pressure difference the piston is pushed by means of the spring element into its closed position or into its stopped position with the adjusting means.

In both embodiments the relative position of the piston 2 in the closed position, i.e. on contact with the flexible lip 3, is taken up automatically and depends essentially upon the manufacturing tolerances, the gradient of the cone, the elasticity of the flexible lip 3 and the force of the spring element 6. Starting from this neutral position of the piston, in the closed position a certain annular throttle opening between the flexible lip 3 and the piston 2 can be set in a particularly simple and defined manner with the aid of the adjusting means 11 which are constructed for example as an adjusting screw. With a known thread pitch of the adjusting screw and a known gradient of the cone on the piston 2, the size of the annular throttle opening can be determined in a simple manner by the number of turns of the adjusting screw.

In both embodiments the piston has a first contact zone which in the closed position comes into contact with a second contact zone on the housing. In this case the first contact zone on the piston is formed by the cone and the second contact zone on the housing is formed by the flexible lip. However, within the scope of the invention the first contact zone on the piston does not necessarily have to be constructed as a cone. It is also conceivable for the flexible lip to be provided on the piston and to come into contact with a second contact on the housing which is for example of conical construction.

I claim:

1. In a valve construction having a housing member, a piston member mounted within said housing member for movements to and fro between opened and closed positions, one of said members having a first contact zone and the other of said members having a second contact zone, said contact zones being engageable with one another when said piston is in the closed position, one of said contact zones comprising an annular, flexible lip on one of said members and the other of said contact zones comprising a conical surface on the other of said members, said lip and said conical surface being so configured that when said piston is in the closed position said lip engages said conical surface and when said piston is in the opened position clearance exists between said lip and said conical surface, the improvement wherein said lip comprises an integral and unitary part of said one of said members.

2. The construction according to claim 1 wherein the flexible lip is plastically deformable.

3. The construction according to claim 1 wherein the flexible lip is elastically deformable.

4. The construction according to claim 1 wherein the flexible lip is formed of metal.

5. The construction according to claim 1 including a spring reacting between the housing member and the piston member and biasing the piston member toward the closed position.

6. The construction according to claim 1 including adjustable limit means reacting between the housing member and the piston member for limiting movement of the piston member from the opened position to the closed position.

* * * * *